UNITED STATES PATENT OFFICE 2,639,271

STYRENE, ALPHA METHYL STYRENE, DRYING OIL MODIFIED ALKYD RESINS

Gerald A. Griess, Midland, Mich., and Carl V. Strandskov, Des Moines, Iowa, assignors to The Dow Chemical Company, Midland, Mich., a corporation of Delaware No Drawing. Application April 28, 1949, Serial No. 90,264

11 Claims. (Cl. 260—22)

This invention concerns certain new styrene-drying oil modified alkyd resins and a method of making the same. It relates more particularly to styrene-drying oil modified alkyd resins by reaction of a resinous styrenated-drying-oil-polyhydric alcohol interpolymer containing free hydroxyl groups with phthalic acid, or phthalic anhydride.

According to the invention, the new styrene-drying oil modified alkyd resins may be prepared by forming a resinous interpolymer containing free hydroxyl groups, of one or more monovinyl aromatic compounds having the general formula:

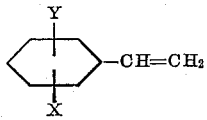

wherein X and Y represent the same or different members of a group consisting of hydrogen, and lower alkyl radicals containing not more than 3 carbon atoms, an alpha-methylene alkyl aromatic compound having the general formula:

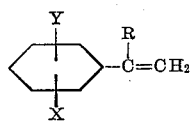

wherein X and Y have the meaning just given and R is an alkyl radical containing not more than 2 carbon atoms, a drying oil, or a mixture of drying oils, as hereinafter specified, and a polyhydric alcohol, and thereafter reacting the polyhydroxy interpolymer with phthalic acid, or phthalic anhydride.

The new styrene-drying oil modified alkyd resins are all soluble in toluene and are useful in the manufacture of film forming compositions such as varnish and enamels. Films of the resins show good adhesion to metal, excellent durability and are resistant to mineral spirits and to aqueous solutions of soap and alkali. The new resins are viscous liquids to semi-solids. Solutions of the resins readily dry in air or by baking to form continuous tough hard films.

We have observed that styrenated-drying oil modified alkyd resins having greater solubility in toluene and other usual varnish solvents are obtained when the polymerizable starting materials contain both a monovinyl aromatic compound, e. g. styrene, and an alpha-methylene alkyl aromatic compound in certain relative proportions, as hereinafter specified, than when styrene or a nuclear substituted styrene alone is a polymerizable component. The alpha-methylene alkyl aromatic compound appears not only to modify the polymerization reaction but also to interpolymerize with the drying oil and styrene, or nuclear-substituted styrene. It reduces the tendency when using partially conjugated drying oils in the polymerization mixture, toward formation of highly cross-linked interpolymers which are insoluble in toluene and are therefore unsuitable as intermediates for preparing the styrene-drying oil modified alkyd resins of this invention.

It is important that the drying oil or mixture of drying oils, employed as starting materials in preparing the interpolymers containing free hydroxyl groups, have an average of not more than 35 per cent of the olefinic linkages thereof conjugated with respect to one another. For convenience, the per cent of the total olefinic linkages in a drying oil which are conjugated is hereinafter referred to as the "degree of conjugation" of the oil.

Any drying oil, or mixture of drying oils having a degree of conjugation not greater than 35 per cent, may be employed in preparing the toluene-soluble interpolymers. Examples of suitable drying oils are linseed oil, soybean oil, dehydrated castor oil, perilla oil and fish oils such as sardine oil. Mixtures of one or more of the unconjugated oils, or oils of low degree of conjugation, just mentioned, with one or more highly conjugated drying oils such as tung oil or oiticica oil may be used, provided such oil mixture has an average degree of conjugation not greater than 35 per cent. Employment of more highly conjugated drying oils frequently results in production of toluene-insoluble polymeric products. Drying oils, or drying oil mixtures, of not more than 30 per cent conjugation are preferably used. In general, unbodied raw and refined oils are superior to bodied oils, but the latter may sometimes be used.

As the monovinyl aromatic compound of the interpolymers, styrene is preferred, but other polymerizable monovinyl aromatic compounds such as ortho-methyl styrene, para-methyl styrene, ortho-ethyl styrene, para-ethyl styrene, ortho,para-dimethyl styrene, ortho,para-diethyl styrene, ortho-methyl-para-isopropyl styrene, etc., may be employed.

Alpha-methyl styrene is preferably used as the alpha-methylene alkyl aromatic component of the interpolymers. However, other alpha-methylene alkyl aromatic compounds such as para-methyl-alpha-methyl styrene, alpha-ethyl styrene, ortho,para-dimethyl alpha-methyl styrene, or para-isopropyl alpha-methyl styrene, or mixtures of any of these compounds with one another, or with alpha-methyl styrene, may be used.

The polyhydric alcohol reactant should contain three or more hydroxyl groups. Examples of such polyhydric alcohols are glycerine, pentaerythritol, mannitol, sorbitol, trimethylolpropane, and 2,2,6,6-tetramethylolcyclohexanol.

The interpolymers containing free hydroxyl groups to be employed in making the new styrene-drying oil modified alkyd resins of this invention may be prepared by alcoholysis of a toluene-soluble interpolymer of from 30 to 90, preferably from 40 to 70, parts by weight of a drying oil, or a mixture of drying oils, having an average degree of conjugation not greater than would correspond to 35 per cent of the total unsaturation and from 70 to 10, preferably from 60 to 30, parts of a mixture consisting of a monovinyl aromatic compound and an alpha-methylene alkyl aromatic compound having the aforementioned formulas, in which mixture of aromatic compounds the alpha-methylene alkyl aromatic compound is from 20 to 50 per cent by weight, with a polyhydric alcohol to partially hydroxylate the glyceride structure of the drying oil in the interpolymer and form a product containing free hydroxyl groups.

The interpolymers are subjected to alcoholysis with a polyhydric alcohol, e. g. glycerine or pentaerythritol, etc., in amount sufficient to partially hydroxylate the glyceride structure of the drying oil, i. e. a portion of the carboxylic acid groups of the drying oil glyceride are displaced by the added polyhydric alcohol thereby leaving one or more free hydroxyl groups in the interpolymerized oil glyceride nucleus. The polyhydric alcohol may be employed in amount corresponding to from 0.06 to 0.3, preferably from 0.1 to 0.2 part, by weight per part of the drying oil.

The alcoholysis reaction may be carried out by heating a mixture of the interpolymer and the polyhydric alcohol, in the desired proportions, to a temperature of from 180° to 250° C., until the mixture forms a single phase, but temperatures of from 200° to 240° C. are preferred. Alcoholysis is usually complete after 1 to 4 hours of heating at a temperature of 200° C., or above. The alcoholysis is preferably carried out in contact with an inert atmosphere, e. g. nitrogen, or methane, or with limited access of air to the reactants such as by way of a reflux condenser to the reactants.

The reaction may be accelerated by adding to the starting mixture a small amount, e. g. from 0.01 to 0.2 per cent by weight, of an alcoholysis catalyst such as litharge, lime, sodium hydroxide, zinc oxide, magnesium oxide, or sodium alcoholate, etc.

Alternatively, the interpolymers containing free hydroxyl groups may be prepared from the reactants in the relative proportions just given, by first subjecting the drying oil, or mixture of drying oils, having an average degree of conjugation not greater than 35 per cent, to alcoholysis with the polyhydric alcohol to partially hydroxylate the glyceride structure of the drying oil and form a product in which one or more of the fatty acid groups of the oil glyceride is displaced by the added polyhydric alcohol thereby leaving one or more free hydroxyl groups in the oil glyceride nucleus. Thereafter, the hydroxylated drying oil is interpolymerized with the mixture consisting of a monovinyl aromatic compound, e. g. styrene, and an alpha-methylene alkyl aromatic compound, preferably alpha-methyl styrene.

The order in which the various ingredients are added to the reaction mixture in forming the interpolymers containing free hydroxyl groups depends largely upon the particular formula being used. In general, when a drying oil, or a mixture of drying oils, having a degree of conjugation approaching the upper limit herein specified, is employed, the usual procedure is to heat the drying oil and polyhydric alcohol until a single phase is formed and thereafter to interpolymerize the alcoholysis product with the mixture of the monovinyl aromatic compound and the alpha-methylene alkyl aromatic compound. When the drying oil, e. g. linseed oil, or dehydrated castor oil, has a low degree of conjugation, the drying oil and the mixture consisting of a monovinyl aromatic compound and an alpha-methylene alkyl aromatic compound is usually interpolymerized and the interpolymer is thereafter subjected to alcoholysis with the polyhydric alcohol, although either of the procedures just described may be employed.

The polymerizable starting materials are preferably polymerized in a closed container, or in contact with an inert atmosphere, e. g. nitrogen, or methane, etc., in the absence of an inert liquid media such as benzene, toluene, or xylene, etc. However, the polymerization may be carried out with limited access of air, e. g. by way of a reflux condenser, to the mixture. In practice, the drying oil, or the alcoholysis product of the drying oil and the polyhydric alcohol, the monovinyl aromatic compound, e. g. styrene, and the alpha-methylene alkyl aromatic compound, preferably alpha-methyl styrene, are mixed together in the desired proportions, and the mixture is heated at a temperature below its atmospheric boiling point until the polymerization is substantially complete. The polymerization may be carried out at temperatures of from 120° to 300° C., but temperatures of from 150° to 200° C. are preferred. The mixture should not be heated to a temperature sufficient to cause decomposition of the product. Polymerization is usually complete after 10 to 50 hours of heating at the preferred temperatures.

The rate of interpolymerization may be increased by adding to the starting mixture a small amount, e. g. from 0.5 to 3 per cent by weight, of a polymerization catalyst such as benzoyl peroxide, acetyl benzoyl peroxide, tertiary butyl perbenzoate, or tertiary butyl hydroperoxide, etc.

In preparing certain of the interpolymers containing free hydroxyl groups, particularly those in which a drying oil having a low degree of conjugation such as linseed oil, or dehydrated castor oil, the monovinyl aromatic compound, e. g. styrene, and the alpha-methylene alkyl aromatic compound, preferably alpha-methyl styrene, are interpolymerized, the clarity and solubility of the styrenated-drying oil interpolymers in toluene are materially affected by the manner in which the constituents of the interpolymerizing mass are mixed together. Best results are frequently obtained when the drying oil, or the alcoholysis product of the drying oil and the polyhydric alcohol, is first heated to a polymerization temperature and a mixture of the monovinyl aromatic compound, e. g. styrene, the alpha-methylene alkyl aromatic compound, e. g. alpha-methyl styrene, and a polymerization catalyst is added over a period of several hours.

The interpolymers containing free hydroxyl groups are converted to the phthalates by reaction of the hydroxylated interpolymers with phthalic acid, or phthalic anhydride, in amount corresponding to a chemically equivalent proportion to the free hydroxyl groups in the interpolymer. The phthalic acid, or its anhydride, is usually employed in amount chemically equivalent to the proportion of polyhydric alcohol employed, although somewhat greater or lesser proportions may be used, e. g. an amount corresponding to 10 per cent greater than, or less than, a chemically equivalent proportion.

The esterification reaction of the interpolymer containing free hydroxyl groups with the phthalic acid, or phthalic anhydride, is preferably carried out in contact with an inert atmosphere such as carbon dioxide, or nitrogen, etc. However, the reaction may be carried out with limited access to air, e. g. by way of a reflux condenser, to the mixture, or preferably by way of a goose-neck and condenser to separate volatile ingredients, including water, from the reaction mixture. In practice, the interpolymer containing free hydroxyl groups and the phthalic acid, or phthalic anhydride, preferably the latter, are mixed together in the desired proportions, and the mixture is heated at a temperature below the decomposition temperature of the product, until esterification of the hydroxyl groups is substantially complete. The esterification may be carried out at temperatures of from 200° to 300° C., preferably from 230° to 260° C. Esterification is usually complete after 1 to 4 hours of heating at the latter temperatures. Upon completion of the esterification reaction, unreacted phthalic acid, or phthalic anhydride may be removed by blowing the reaction mixture with an inert gas, e. g. carbon dioxide, or nitrogen, to obtain the styrene-drying oil modified alkyd resin in purified form.

The following examples illustrate practice of the invention, but are not to be construed as limiting the scope thereof.

Example 1

A toluene-soluble interpolymer of 50 parts by weight of alkali refined linseed oil and 50 parts of a mixture consisting of 70 per cent by weight styrene and 30 per cent alpha-methyl styrene was employed to make a styrene-drying oil modified alkyd resin. A mixture consisting of 800 grams of this interpolymer, 83.6 grams (0.91 mole) of glycerine, as an aqueous solution containing 95 per cent by weight concentration, and 0.1 gram of calcium oxide as alcoholysis catalyst, was placed in a 2 liter flask equipped with a reflux condenser, a water separator and a gas inlet for admitting gas below the surface of the reactants. The mixture was stirred and heated to a temperature of 250° C., for a period of 2 hours. During the reaction period volatile ingredients including water, were separated from the reaction mixture. The mixture was then cooled to 200° C., and 202 grams (1.37 moles) of phthalic anhydride added thereto. The temperature of the mixture was again raised to 250° C., and maintained at this temperature for a period of 1 hour, while a stream of nitrogen was slowly bubbled through the reaction mixture via the gas inlet. Volatile ingredients, including water, were separated from the reaction mixture by way of the condenser and water separator. The product was a pale yellow resin having an acid number of 15.

A varnish was prepared by dissolving 60 parts by weight of the resin in 40 parts of a solvent consisting of equal parts of mineral spirits (an aliphatic hydrocarbon varnish solvent) and Solvesso No. 2 (a hydrogenated petroleum naphtha having a boiling range of about 200° to 275° F.) and adding as driers, 0.02 per cent by weight cobalt and 0.1 per cent lead as the naphthenates. The varnish had a viscosity of D (Gardner-Holdt scale). Films of this varnish were clear and hard. The films on drying in air, or by baking, show good adhesion to metal, excellent color and good resistance to mineral spirits.

Example 2

Unbodied dehydrated castor oil, having the following constants, as determined by conventional tests; iodine number 142; saponification number 190; acid number 4.5; unsaponifiable 0.3, was employed in making a resin. A mixture consisting of 37.7 parts by weight of the dehydrated castor oil, 7.5 parts of glycerine and 0.04 part of CaO as alcoholysis catalyst, was placed in a reaction flask equipped with a condenser and stirrer. The mixture was stirred and heated to a temperature of 230° C., for a period of 1 hour, then cooled to below 150° C. A mixture consisting of 26.4 parts of styrene and 11.3 parts of alpha-methyl styrene, having 2 parts of benzoyl peroxide dissolved therein as polymerization catalyst, was added to the alcoholized dehydrated castor oil and the resulting mixture heated to a temperature of 150° C., for a period of 3 hours. Thereafter, the mixture was heated to 200° C., and maintained at this temperature for 21 hours longer. 15.1 parts of phthalic anhydride was added to the alcoholized dehydrated castor oil-styrene interpolymer and the mixture heated to a temperature of 245° C., for a period of 1 hour. During this reaction period volatile ingredients including water, were separated from the reaction mixture by way of a goose-neck and condenser. The product was a clear brown resin having an acid number of 31.4 and was soluble in toluene.

A varnish was made by dissolving one part by weight of the resin in a solvent consisting of two parts of mineral spirits (an aliphatic hydrocarbon varnish solvent) and one part xylene, and adding as driers 0.02 per cent cobalt, 0.005 per cent manganese and 0.15 per cent lead as the naphthenates, together with 0.1 per cent guiacol to prevent skinning. The varnish had a viscosity of E (Gardner-Holdt scale) and a color of 9–10 (Gardner). Films of this varnish show good adhesion to metal, pale color, excellent durability, and good resistance to mineral spirits and to aqueous soap and alkali solutions.

Example 3

A mixture consisting of 38.5 parts by weight of the dehydrated castor oil of Example 1, and 3.5 parts of glycerine, together with 0.04 part of CaO as alcoholysis catalyst was heated for 1 hour at a temperature of 230° C., then cooled to about 140° C. A mixture consisting of 35 parts styrene and 15 parts of alpha-methyl styrene, having 2 parts of benzoyl peroxide as polymerization catalyst dissolved therein, was added to the glycerine dehydrated castor oil reaction product and the resulting mixture heated to a temperature of 150° C. for a period of 3 hours. Thereafter, the mixture was heated to 200° C., and maintained at this temperature for 8 hours longer. Six parts of phthalic anhydride was added to the hydroxylated dehydrated castor oil-styrene interpolymer and the mixture heated to a temperature of 245° C., for a period of 4 hours. The product was a yellow resin.

A varnish was made by dissolving 60 parts by weight of the resin in 40 parts of the solvent mixture of Example 1. The varnish had a viscosity of H-I (Gardner-Holdt) and a color of 6-7 (Gardner). Films of this varnish showed a slight haze, good adhesion to metal and excellent durability.

*Example 4*

A charge of 38.1 parts by weight of dehydrated castor oil, 17.8 parts of styrene, 14.55 parts of alpha-methyl styrene and 1.45 parts of benzoyl peroxide as polymerization catalyst was interpolymerized by heating the mixture for 3 hours at a temperature of 150° C., then raising the temperature of the mixture to 200° C. and heating for 16 hours longer. Thereafter, 8.55 parts of glycerine and 0.1 part of CaO as alcoholysis catalyst was added to the interpolymer and the mixture heated at a temperature of 250° C., over a period of 2 hours, then cooled to 150° C. 19.55 parts of phthalic anhydride was then added to the alcoholyzed interpolymer and the resulting mixture heated at a temperature of 250° C., over a period of 2 hours while bubbling nitrogen through the reaction mixture. Thereafter, the reaction mixture was blown with nitrogen, then cooled.

A varnish was prepared by dissolving the resin in 150 parts by weight of a mixture consisting of 80 per cent by weight toluene and 20 per cent of mineral spirits and adding as driers 0.02 per cent cobalt and 0.15 per cent lead as the naphthenates. The varnish had a viscosity of C-D (Gardner-Holdt). Films of this varnish after drying in air at room temperature for 48 hours had a Sward hardness of 12. The films are clear and show good resistance to mineral spirits and to aqueous solutions of soap and alkali.

Other modes of applying the principle of the invention may be employed instead of those explained, change being made in the method or products herein disclosed, provided the steps or substances stated by any of the following claims or the equivalent of such stated steps or substances be employed.

We claim:

1. In a method of making a styrene-drying oil modified alkyd resin, the step of forming a phthalate of a toluene-soluble interpolymer containing free hydroxyl groups resulting from the interpolymerization and condensation of from 30 to 90 parts by weight of a drying oil having a degree of conjugation not greater than 35 per cent, from 70 to 10 parts of a mixture consisting of from 50 to 80 per cent by weight of a monovinyl aromatic compound having the formula:

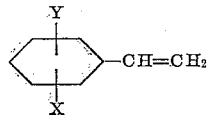

and from 50 to 20 per cent of an alpha-methylene alkyl aromatic compound having the formula:

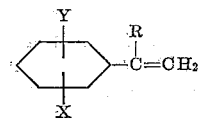

in which formulas X and Y each represents a member of the group consisting of hydrogen and lower alkyl radicals containing not more than 3 carbon atoms and R is an alkyl radical containing not more than 2 carbon atoms and from 0.06 to 0.3 part by weight of a polyhydric alcohol per part of drying oil, by mixing the interpolymer containing free hydroxyl groups with a chemically equivalent proportion of phthalic anhydride and heating the mixture at a temperature of from 230° to 260° C.

2. In a method of making a styrene-drying oil modified alkyd resin, the steps of subjecting from 30 to 90 parts by weight of a drying oil having a degree of conjugation not greater than 35 per cent to alcoholysis with from 0.06 to 0.3 part of a polyhydric alcohol per part of drying oil by heating the reactants at a temperature of from 200° to 240° C., interpolymerizing the alcoholysis product with from 70 to 10 parts of a mixture consisting of from 50 to 80 per cent by weight of a monovinyl aromatic compound having the formula:

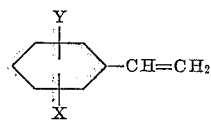

and from 50 to 20 per cent of an alpha-methylene alkyl aromatic compound having the formula:

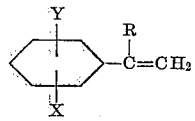

in which formulas X and Y each represents a member of the group consisting of hydrogen and lower alkyl radicals containing not more than 3 carbon atoms and R is an alkyl radical containing not more than 2 carbon atoms, by heating the polymerizable materials at a temperature of from 120° to 300° C., thereafter mixing the interpolymer containing free hydroxyl groups with a chemically equivalent proportion of phthalic anhydride and heating the mixture at a temperature of from 230° to 260° C.

3. In a method of making a styrene-drying oil modified alkyd resin, the steps of interpolymerizing from 30 to 90 parts by weight of a drying oil having a degree of conjugation not greater than 35 per cent and from 70 to 10 parts of a mixture consisting of from 50 to 80 per cent by weight of a monovinyl aromatic compound having the formula:

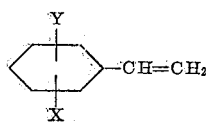

and from 50 to 20 per cent of an alpha-methylene alkyl aromatic compound having the formula:

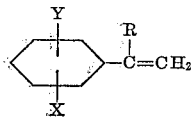

in which formulas X and Y each represents a member of a group consisting of hydrogen and lower alkyl radicals containing not more than 3 carbon atoms and R is an alkyl radical containing not more than 2 carbon atoms, by heating the polymerizable materials at a temperature of from 120° to 300° C., subjecting the interpolymer to alcoholysis with from 0.06 to 0.3 part by weight of a polyhydric alcohol per part of drying oil by heating the mixture of interpolymer and polyhydric alcohol at a temperature of from 200° to 240° C., thereafter mixing the interpolymer containing free hydroxy groups with a chemically equivalent amount of phthalic anhydride and heating the mixture to a temperature of from 230° to 260° C.

4. In a method of making a styrene-drying oil modified alkyd resin, the step of forming a phthalate of an interpolymer containing free hydroxyl groups resulting from the alcoholysis at a temperature of from 200° to 240° C., of a toluene-soluble interpolymer of from 30 to 90 parts by weight of a drying oil having a degree of conjugation not greater than 35 per cent and from 70 to 10 parts of a mixture consisting of from 50 to 80 per cent by weight of styrene and from 50 to 20 per cent of alpha-methyl styrene, with from 0.1 to 0.2 part by weight of a polyhydric alcohol per part of drying oil, by mixing the interpolymer containing free hydroxyl groups with a chemically equivalent proportion of phthalic anhydride and heating the mixture at a temperature of from 230° to 260° C.

5. In a method of making a styrene-drying oil modified alkyd resin, the step of forming a phthalate of an interpolymer containing free hydroxyl groups resulting from the interpolymerization at a temperature of from 150° to 200° C., of from 10 to 70 parts by weight of a mixture consisting of from 50 to 80 per cent by weight of styrene and from 50 to 20 per cent of alpha-methyl styrene and the alcoholysis product of from 90 to 30 parts of a drying oil having a degree of conjugation not greater than 35 per cent, hydroxylated at temperatures of from 200° to 240° C., with from 0.1 to 0.2 part by weight of a polyhydric alcohol per part of drying oil, by mixing the interpolymer containing free hydroxyl groups with a chemically equivalent proportion of phthalic anhydride and heating the mixture at a temperature of from 230° to 260° C.

6. In a method of making a styrene-drying oil modified alkyd resin, the steps of hydroxylating from 30 to 90 parts by weight of a drying oil having a degree of conjugation not greater than 35 per cent with from 0.1 to 0.2 part of a polyhydric alcohol per part of drying oil by heating the alcoholysis mixture at a temperature of from 200° to 240° C., interpolymerizing the hydroxylated drying oil with from 70 to 10 parts of a mixture consisting of from 50 to 80 per cent by weight of styrene and from 50 to 20 per cent of alpha-methyl styrene by heating the polymerization mixture at a temperature of from 150° to 200° C., and thereafter forming the phthalate of the interpolymer containing free hydroxyl groups by heating the same in admixture with a chemically equivalent proportion of phthalic anhydride at a temperature of from 230° to 260° C.

7. A styrene-drying oil modified alkyd resin composed of a phthalate of an interpolymer of from 30 to 90 parts by weight of a drying oil having an average degree of conjugation not greater than 35 per cent, from 70 to 10 parts of a mixture consisting of from 50 to 80 per cent by weight of a monovinyl aromatic compound having the formula:

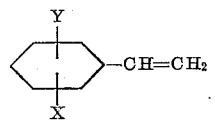

and from 50 to 20 per cent of an alpha-methylene alkyl aromatic compound having the formula:

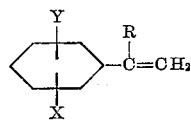

in which formulas X and Y each represents a member of the group consisting of hydrogen and lower alkyl radicals containing not more than 3 carbon atoms and R represents an alkyl radical containing not more than 2 carbon atoms, and from 0.06 to 0.3 part by weight of a polyhydric alcohol per part of drying oil.

8. A styrene-drying oil modified alkyd resin composed of a phthalate of an interpolymer of from 30 to 90 parts by weight of a drying oil having an average degree of conjugation not greater than 35 per cent, from 70 to 10 parts of a mixture consisting of from 50 to 80 per cent by weight of styrene and from 50 to 20 per cent of alpha-methyl styrene, and from 0.1 to 0.2 part by weight of a polyhydric alcohol per part of drying oil.

9. A styrene-drying oil modified alkyd resin as described in claim 8, wherein the drying oil is linseed oil.

10. A styrene-drying oil modified alkyd resin as described in claim 8, wherein the drying oil is dehydrated castor oil.

11. A styrene-drying oil modified alkyd resin as described in claim 8 wherein the drying oil is a mixture of linseed oil, tung oil and dehydrated castor oil in proportions such that the degree of conjugation of the drying oil is not greater than 30 per cent.

GERALD A. GRIESS.
CARL V. STRANDSKOV.

References Cited in the file of this patent

UNITED STATES PATENTS

| Number | Name | Date |
|---|---|---|
| 2,392,710 | Wakeford et al. | Jan. 8, 1946 |
| 2,457,768 | Arvin et al. | Dec. 28, 1948 |
| 2,468,748 | Griess et al. | May 3, 1949 |
| 2,468,770 | Morris et al. | May 3, 1949 |
| 2,470,752 | Bobalek | May 24, 1949 |
| 2,560,592 | Opp et al. | July 17, 1951 |